United States Patent [19]
Hennessey et al.

[11] Patent Number: 6,159,102
[45] Date of Patent: Dec. 12, 2000

[54] FLEXIBLE COUPLING

[75] Inventors: Michael W. Hennessey, Colorado Springs, Colo.; Jose Florian B. Barin, Bloomingdale, Ill.

[73] Assignee: Lovejoy, Inc., Downers Grove, Ill.

[21] Appl. No.: 09/181,209

[22] Filed: Oct. 28, 1998

Related U.S. Application Data

[63] Continuation-in-part of application No. 09/076,136, May 11, 1998.

[51] Int. Cl.[7] ..................................................... F16D 3/54
[52] U.S. Cl. .............................. 464/88; 464/154; 464/901
[58] Field of Search ................................ 464/73, 74, 75, 464/87, 88, 149, 150, 153, 154, 173, 901

[56] References Cited

U.S. PATENT DOCUMENTS 3,362,191  1/1968  Louette ..................................... 464/88
5,139,460  8/1992  Hoyt, III et al. .
5,295,911  3/1994  Hoyt, III et al. .
5,738,585  4/1998  Hoyt et al. ................................. 464/88

*Primary Examiner*—Lynne H. Browne
*Assistant Examiner*—Kenneth Thompson
*Attorney, Agent, or Firm*—Knechtel, Demeur & Samlan

[57] ABSTRACT

A flexible shaft coupling device having two hubs with teeth extending from each hub toward the other hub. The teeth are in parallel alignment and spaced from each other. A flexible elastomeric belt fills the gaps between adjacent pairs of teeth. A retainer band is mounted around the belt to keep the belt securely in place. A locating pin on the interior surface of the band is received in a J-shaped groove cut in the exterior of the belt. This releasably locks the band in place around the belt. In an alternate embodiment, the J-shaped groove is replaced with a first groove extending across the belt and a pair of oppositely extending perpendicular grooves intersecting the first groove. This configuration allows the band to be slid onto the coupling from either end.

9 Claims, 3 Drawing Sheets

FLEXIBLE COUPLING

I. CROSS REFERENCE TO RELATED APPLICATION

This Application is a Continuation-In-Part Application of U.S. application Ser. No. 09/076,136 filed on May 11, 1998.

II. BACKGROUND AND SUMMARY OF THE INVENTION

This invention relates to couplings used for transmitting rotation from one shaft to another, and more particularly, to a coupling using an elastomeric belt with a retaining sleeve used to keep the belt in place.

Various types of flexible couplings have been used for connecting one shaft to another. These couplings compensate for relatively minor degrees of shaft misalignment which are normally encountered in manufacturing operations.

One type of prior art coupling uses two hubs, each hub having a plurality of projecting teeth extending from the hub face toward the other hub face. Such couplings, called jaw-type couplings, are sold by Lovejoy, Inc. of Downers Grove, Ill. The hubs are each mounted on one of the shafts. The teeth extending from each hub face are of a length so that they will be slightly separated from the other hub face when the coupling is assembled. The teeth, which are parallel to but overlap each other, are separated by spaces. An elastomeric element, often called a spider, occupies the plurality of spaces formed between adjacent teeth. Thus, the force from the teeth of the one hub is transmitted through the elastomeric element to the teeth of the other hub. These couplings operate with the elastomeric element in compression and have the characteristics of compactness, capable of transmitting large forces and continuing to transmit rotational forces even when the elastomeric element fails. This last characteristic can be an advantage or a shortcoming in that if the elastomeric element fails, the teeth of one hub strike the teeth of the other hub and continue to drive the driven shaft and any equipment to which it is connected. Thus, in an overload condition, the driven equipment is not protected by the coupling.

Another type of flexible coupling is illustrated in U.S. Pat. No. 5,139,460 by Hoyt, III et al. This coupling is similar to the above described coupling in that a pair of hubs each having extending teeth are mounted on their respective shafts. However, the teeth on one hub are parallel to and aligned with the teeth on the other hub. A belt surrounds the hubs and fills in the spaces between adjacent pairs of teeth. Projections on the belt engage receptacles on the hub teeth to prevent the hubs from moving apart. In this design, the belt operates in shear.

Advantages of this type of design are that the belt provides for misalignment between the shafts; the belt transmits power uniformly; the belt provides damping; and if the belt fails, the driven equipment is protected as it will essentially be disconnected from the drive shaft. Furthermore, this type of design allows the belt to be replaced without disassembling the hubs or moving the equipment connected to the shafts.

Another type of shear coupling is illustrated in U.S. Pat. No. 5,295,911 to Hoyt, III et al. This design illustrates teeth overlapping each other while using an elastomeric belt between overlapping teeth to transmit the torque. There is also shown a retainer ring surrounding the belt to keep the belt in place.

A problem arises in this coupling in that the retainer ring has a tendency to slip from its desired position of being centered on the belt. If the retainer ring slips off the belt, the belt will come loose and the coupling will disengage. One attempt at solving this problem has been to cut a groove or channel in the belt perpendicular to the edge of the belt. Another groove which is cut perpendicular to and intersects with the first groove extends a short distance around the circumference of the belt. There is a pin on the inside surface of the band which is received in the grooves. This design did not provide a completely satisfactory solution as the pin locked the band in place only when rotating in one direction. Thus, there has been, and is still the need, to provide a retainer band that will be securely retained on the belt regardless of the direction of rotation of the hubs.

Accordingly, it is an object of the invention to provide a flexible coupling which operates in shear and utilizes a retainer ring about the elastomeric belt.

It is a related object to provide a shear type flexible coupling which has a retainer ring securely, yet releasably fastened to the elastomeric belt. Yet another object is to provide such an elastomeric belt and retainer ring which secures the retainer ring to the belt regardless of the direction of rotation of the hubs.

The invention disclosed herein provides a shear-type flexible coupling in which the teeth on the hubs are in parallel alignment and spaced from each other. A flexible elastomeric belt fills the gaps between adjacent pairs of teeth. A retainer band is mounted around the belt to keep the belt securely in place. In a first embodiment, the exterior of the belt surface has a J-shaped groove cut therein, with one end extending to the edge of the belt. A locating pin on the inside of the retainer band is slid along the groove until the pin reaches the end of the groove at which point the retainer band is properly centered around the flexible belt.

In a second embodiment, the exterior of the belt surface has a groove cut axially on the outer surface of the belt from one edge of the belt to the other edge. Two perpendicular grooves extend in opposite directions from the axial groove. The locating pin on the retainer band can be slid along either of the perpendicular grooves to lock the retainer band in place regardless of the side from which the band is slid onto the belt or the direction of rotation of the coupling.

III. DESCRIPTION OF THE DRAWINGS

IV. DETAILED DESCRIPTION OF THE PREFERRED EMBODIMENT

Figure 1:
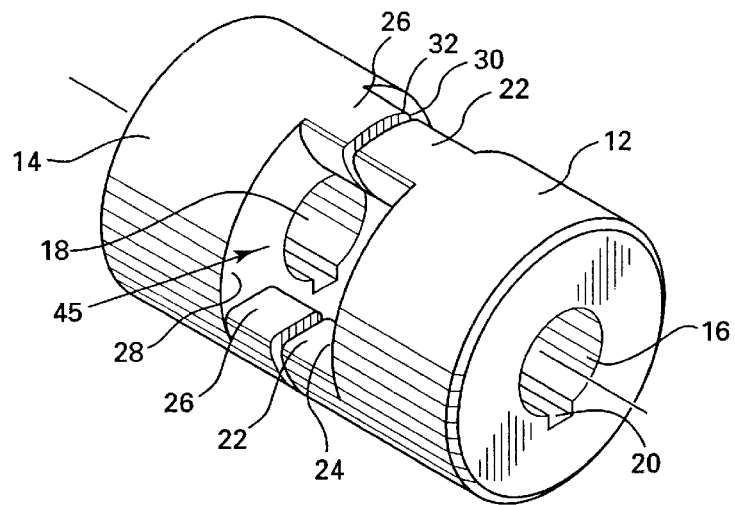
FIG. 1 is a perspective view of two hubs used in a flexible coupling of the present invention.

Turning first to FIG. 1 there is illustrated a pair of hubs used in a unique flexible coupling 10. The coupling 10 is used to connect two aligned shafts (not illustrated),one normally being a drive shaft and the other, a driven shaft. The coupling is comprised of a first cylindrical hub 12 and a second cylindrical hub 14 which are substantially identical to each other. Each cylindrical hub has a central bore 16, 18 which is adapted to receive its respective shaft. The bores 16 and 18 can be of different diameters. It is only necessary that they be the proper size to receive the shaft to which it is to be fastened. The hubs 12 and 14 are secured to the shafts by conventional means such as a keyway 20. However, other conventional manners of affixing the hubs to the shaft can be used such as a set screw or other such similar means.

When the hubs 12 and 14 are mounted to their respective shafts, they are in substantially axial alignment as shown in FIG. 1. A first set of teeth 22 are located on the first face 24 of the hub 12. The cylindrical hub 14 has a second set of teeth 26 projecting from a second face 28. The first teeth 22 terminate at ends 30 and the second teeth 26 terminate at ends 32. The teeth 22 and 26 and their respective ends 30 and 32 will be axially aligned with each other when the hubs are assembled to their respective shafts. However, they will normally be spaced a short distance from each other so that there is not metal to metal contact between the ends 30 and 32.

Figure 2:
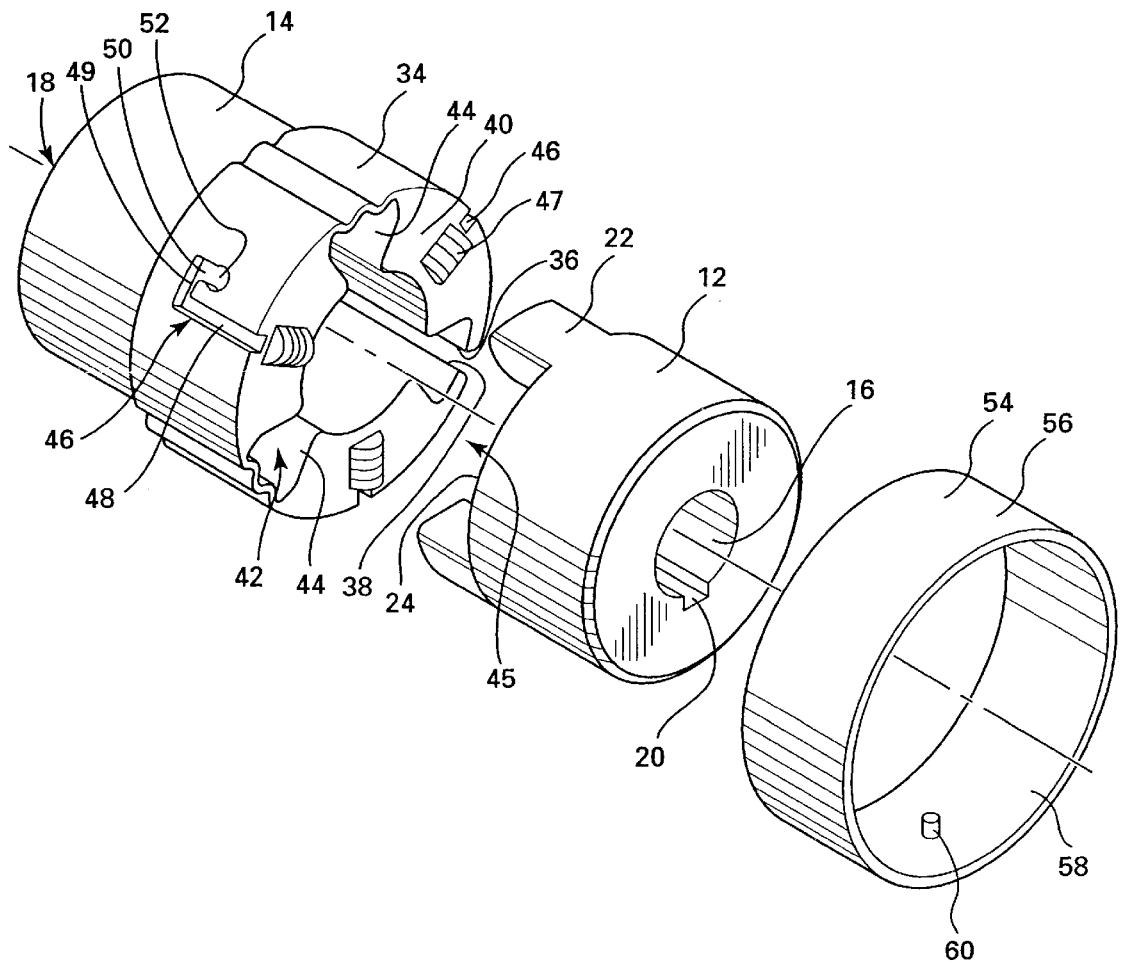
FIG. 2 is an exploded perspective view of the flexible coupling of the present invention.

In FIG. 2 there is illustrated an elastomeric belt 34 which transmits power from the drive shaft to the driven shaft. The elastomeric belt 34 is usually made of rubber, synthetic rubber, plastic material, or polyurethane. The particular material chosen depends upon the size, load, resistance to oils and chemicals, and temperature for a given application. The belt 34 terminates at split ends 36 and 38. Along the interior of the belt 34 are a plurality of wedge shaped projections 40. The projections 40 are separated by openings 42 defined by side walls 44 of the projections 40. The number of projections will equal the number of teeth on the hubs 12 or 14. The wedge shaped projections 40 are dimensioned to be closely received in gaps 45 formed between adjacent pairs of aligned teeth. The teeth 22 and 26 are dimensioned to be closely received within the openings 42 in the elastomeric belt 34. Thus, a close frictional fit is realized between the teeth 22 and 26 and openings 42 with the wedge shaped projections 40 closely received within the gaps 45. The elastomeric belt 34, when it is properly installed on the teeth 22 and 26, will retain the respective teeth in substantially axial alignment with each other. Furthermore, the elastomeric belt 34 serves to transmit the torque from the drive shaft to the driven shaft in the manner intended. The elastomeric belt will accommodate slight amounts of misalignment of the shafts without causing undue stress within the belt itself.

The belt 34 can easily be wrapped around the hubs 12 and 14 when the hubs are mounted to their respective shafts. In this manner, the ends 36, 38 will be spread apart such that the belt 34 will be positioned to allow the projections 40 within their respective gaps. The teeth 22, 26 will be received within the openings 42. The ends 36, 38 will remain slightly spaced from each other when the elastomeric belt is completely assembled to the hubs 12 and 14. Nubs 47 on the faces of the belt 34 keep the teeth ends 30, 32 apart. This avoids metal to metal contact of the ends 30 to 32.

Figure 4:
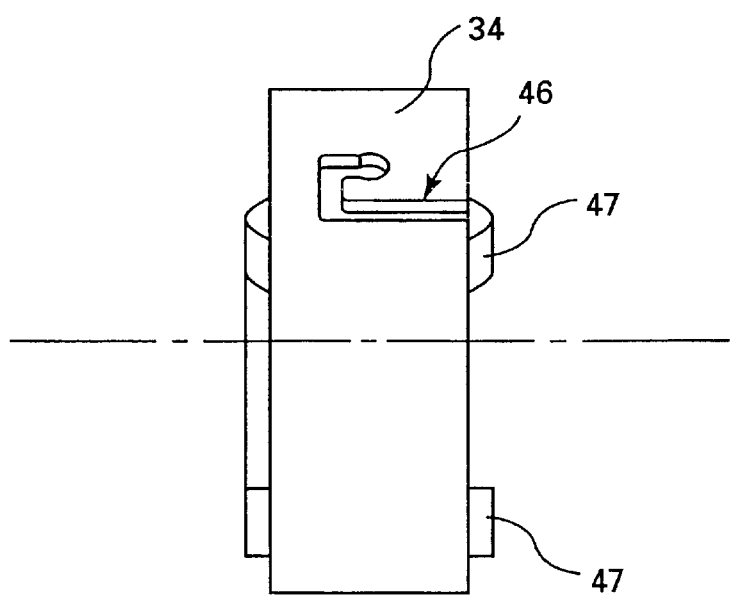
FIG. 4 is a side view of the elastomeric belt illustrated in FIG. 3.

As seen in FIGS. 2 and 4, the outside circumferential wall of the belt 34 has a J-shaped groove 46 cut in the outside wall of the belt 34. The groove 46 has a long axial portion 48 which extends from the edge of the belt 34 slightly past halfway toward the opposite edge. The axial portion 48 connects to a second groove, or circumferential groove 49, which is at 90° along the circumference with respect to the axial portion 48. A third groove or second axial portion 50 reverses back in a direction opposite from which the axial portion 48 began. There is an end cavity 52 which is a slightly larger diameter portion than the width of the second axial portion 50. As seen in FIG. 2, there are three such grooves 46 cut in the outer wall of the belt 34.

A metal collar 54 is used to maintain the belt 34 in a locked position. The metal collar 54 has an outside surface 56, an inside surface 58, and a locating pin 60 on the inside surface 58. The locating pin 60 is placed approximately midway between the edges of the collar 54. The inside surface 58 of the collar 54 is shaped and dimensioned so that the collar 54 may be slid axially relative to the hubs 12 and 14 during assembly and disassembly of the coupling 10 so that the metal collar 54 fits very snugly around the belt 34.

During the assembly process, the metal collar 54 is rotated so that the locating pin 60 is aligned with the entrance of any one of the J-grooves 46. The locating pin 60 enters the groove 46 and the metal collar is worked toward the circumferential portion 49. Once the locating pin 60 strikes the circumferential portion 49, the metal collar 54 is rotated such that the locating pin 60 moves along the circumferential portion 49 until it strikes the end wall of the circumferential portion 49. The collar 54 is then pulled back in the direction opposite the direction in which the pin 60 originally traveled in the axial portion 48 until the locating pin seats in the end cavity 52. All three portions of the groove 46 are smoothly interconnected allowing the pin 60 to easily move from portion to portion. The locating pin 60 and end cavity 52 are located with respect to each other so that when the pin 60 rests in its restrained position in the end cavity 52, the collar 54 is centrally positioned about the belt 34.

The dimension of the groove 46 is slightly less than the diameter of the locating pin 60 so that the pin must be forced along the groove 46 until it snaps into the end cavity 52 at the end of the groove. In this manner, the metal collar 54 is locked in position on the elastomeric belt 34. This locking feature is a vast improvement over the prior devices because in prior devices, the metal collar 54 tends to wander off the elastomeric belt during extended periods of transmitting torque from the drive to the driven shafts. With applicant's design, the locating pin 60 seats in the end cavity 52 and keeps the metal collar 54 in place regardless of the direction of rotation of the drive or driven shafts. Thus, it is not direction sensitive.

The elastomeric coupling 10 allows the elastomeric belt to be replaced without requiring the disassembly or removal of the cylindrical hubs 12 or 14. All that is required is that the metal collar 54 be removed in the reverse sequence of events used for mounting it and then sliding it off the elastomeric belt 34. The ends 36 and 38 are spread apart from each other and the belt 34 pulled off from the first and second teeth 22 and 26. A new belt 34 is installed and the metal collar slid back over the belt 34 with the locating pin 60 being moved through the J-groove 46 until it seats into the end cavity 52.

Other configurations rather than a J-groove could also be utilized. For example, the axial portion 48 can extend from one end of the elastomeric belt all the way through to the other. In this manner, the metal collar 54 can be slid on and off in either direction from the cylindrical hub 12 to the cylindrical hub 14. Another configuration is for the groove 46 to be configured as a "Z" shape with the second axial portion 50 being in the same direction as the pin 60 traveled in the axial portion 48. The circumferential portion 49 does not necessarily have to be at 90° with respect to the axial portion 48, although 90° is preferred. It is preferable that the groove 46 terminates in an end cavity which locks the locating pin 60 in place. Whatever configuration is chosen for the groove 46, it is preferred that the locating pin be placed on the inside surface 58 of the collar 54 such that the metal collar 54 will be properly positioned and located on the elastomeric belt 34 so that the edges of the collar 54 are substantially aligned with the edges of the elastomeric belt.

Figure 3:
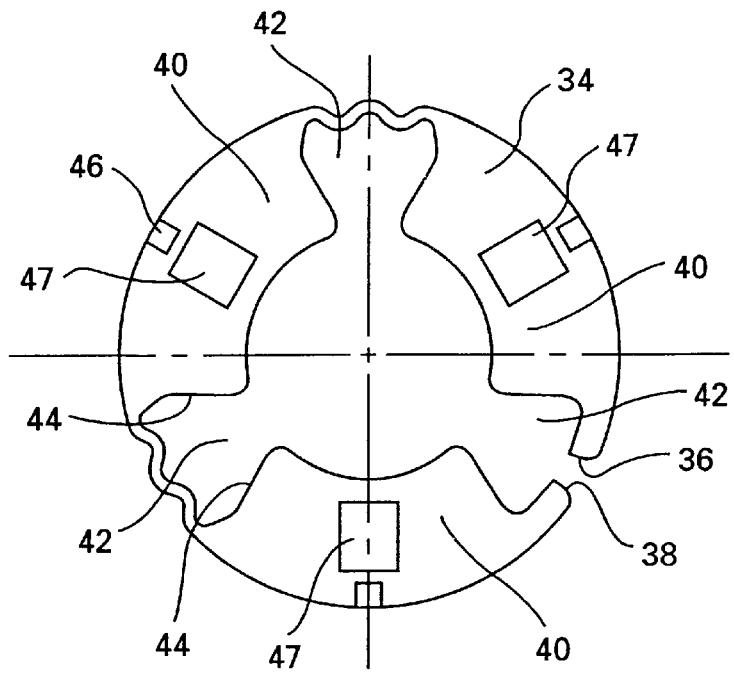
FIG. 3 is an end view of the elastomeric belt used in the inventive coupling.
Figure 5:
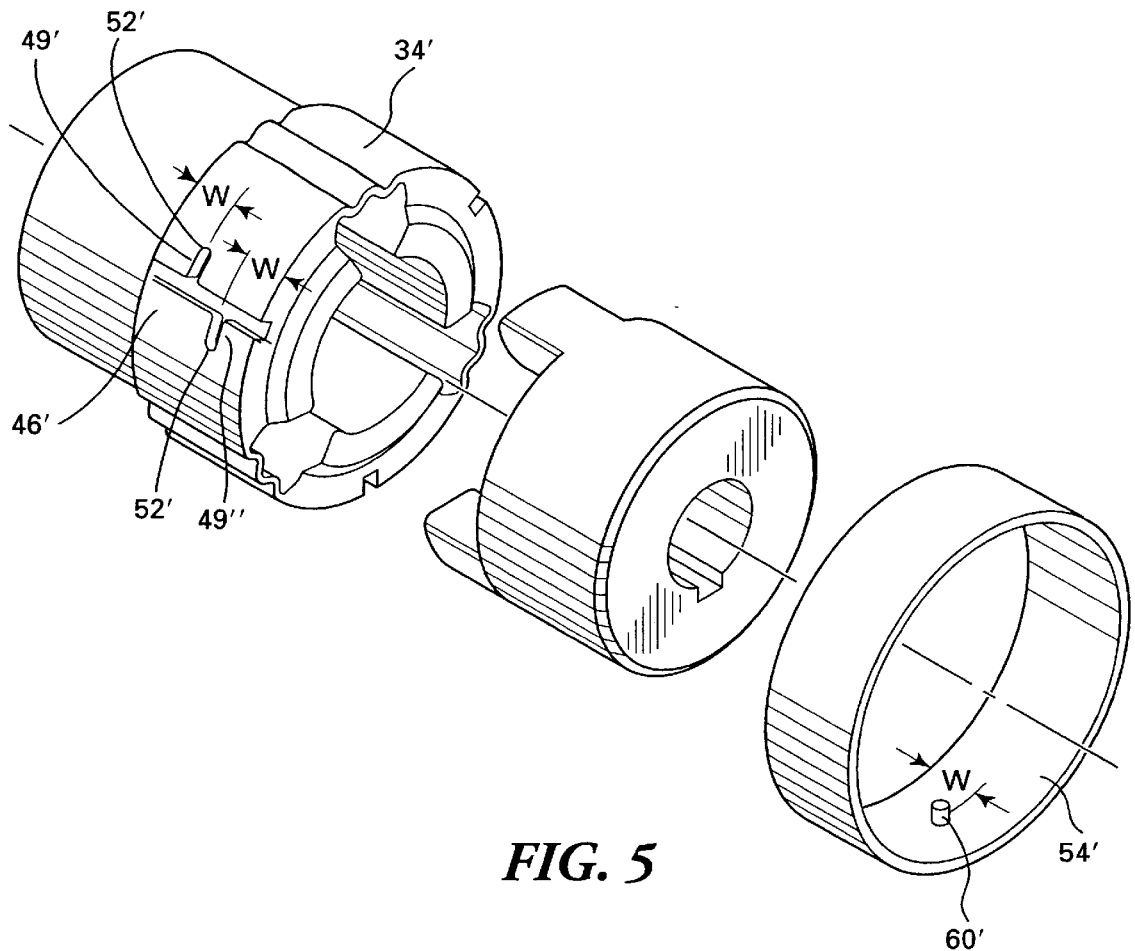
FIG. 5 is an exploded view of an alternate embodiment of the flexible coupling.
Figure 6:
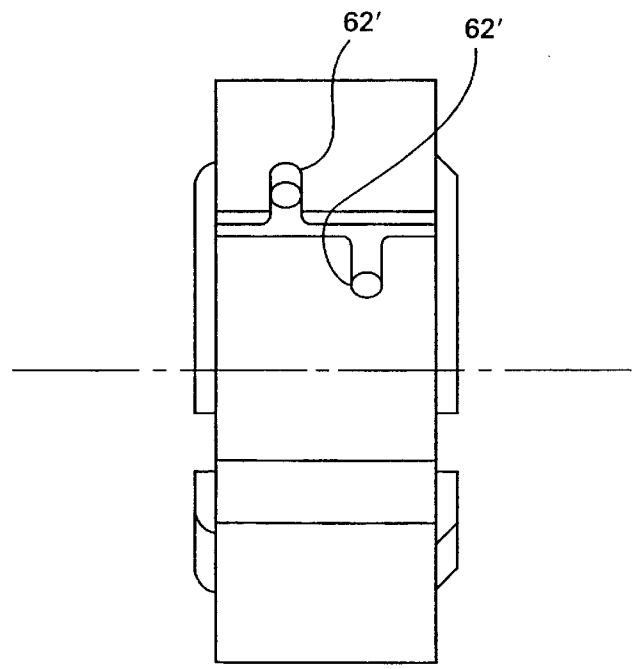
FIG. 6 is a side view of the elastomeric belt illustrated in FIG. 5.

In the alternate embodiment illustrated in FIGS. 5 and 6, there is shown a coupling which is similar to the device illustrated in FIGS. 2–4 where the parts in both couplings are identical, the same part numbers will be used. The cylindrical hubs 12 and 14 remain unchanged. However, the elastomeric belt 34 and collar 54 are different. In the alternate embodiment, an elastomeric belt 34' has three straight grooves 46' spaced equidistant from each other cut in an axial direction along the outer perimeter from one edge of the belt 34' to the outer edge.

There are a pair of second circumferential grooves 49' and 49" which are cut at 90° along the circumference with respect to each of the straight groove 46'. The circumferential grooves 49' and 49" are positioned a distance "w" from the edge of belt 34'. There is an end cavity 5 which is of slightly larger diameter than the width of the circumferential grooves 49' and 49".

There is a metal collar 54' which is similar to the metal collar 54 except that the locking pin 60 is axially displaced in the alternate embodiment and shown as 60'. Unlike the first embodiment, the locating pin 60' is not placed centrally between the edges of the collar 54' but is offset so that it is disposed the distance w from one edge of the collar 54'.

Assembly of the coupling is similar to the first embodiment but has the advantage that the collar 54' can be slid over the belt 34' from either end of the coupling. In the first embodiment the collar 54 could only be slid onto the belt 34 from the side having the J-groove 46 open along one edge. In the alternate embodiment, the collar 54' can be slid over the belt 34' from either end due to the fact that the locating pin 60' can enter the groove 46' from either a of the belt 34'.

As illustrated in FIG. 5, the collar 54' is slipped over the belt 34' with the pin 60' aligned within the groove 46'. The collar 54' is worked along the groove 46' until the pin 60' reaches the circumferential groove 49'. The collar 54' is rotated clockwise so that the pin 60' moves into and along the groove 49' until the pin reaches the end cavity 52'. Due to the fact that the width of the grooves 46', 49' and 49" is very slightly smaller than the diameter of the pin 60', the pin 60' is forced along the groove until it reaches the end cavity 52'. The diameter of end cavity 52' is approximately the same as the diameter of pin 60' so that pin 60' snaps into cavity 52' where it is securely retained.

In the preferred embodiment, the cavity 52' experiences an increase in diameter as compared to the width of the groove 49', in the direction toward the center line of the belt 34'. This is shown as a protruding cutout 62' in FIG. 6. This results in the pin 60' moving toward the center of the belt 34' when the pin 60' seats in the cavity 52'.

With this arrangement, the collar 54' can be slid onto the belt 34' from either direction with the pin 60' engaging either groove 49' or 49" depending upon the orientation of the collar 54' and the pin 60'. B orienting the collar 54' properly, the coupling will remain securely in place regardless of direction of rotation. For example, as seen in FIG. 5, if the drive shaft is rotating in the clockwise rotation, it is preferable if the pin 60' is inserted through groove 49'. If counter-clockwise rotation is expected, the collar 54' is rotated 180° and the pin 60° is inserted through groove 49".

Thus, while there has been provided a flexible coupling that has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:
1. A shaft coupling comprising:
first and second hubs, each having respective first and second faces;
first and second pluralities of teeth extending from the respective first and second faces, the teeth on the first face in parallel alignments with the teeth on the second face, the aligned teeth forming gaps between adjacent pairs of aligned teeth;
a split, flexible belt having opposed edges and an inside and an outside surface, a plurality of spaced projections on the inside surface, each of the projections occupying one of the gaps,
a first groove on the outside surface of the belt extending substantially perpendicular from one edge of the belt,
a second groove on the outside surface of the belt in communication with the first groove and extending substantially perpendicular from the first groove and positioned between a mid-point of the belt and one of the edges, the second grove terminating at an end cavity,
a third groove on the outside surface of the belt in communication with the first groove, and extending substantially perpendicular to the first groove, but in an opposite circumferential direction than the second groove and positioned between the mid-point and the other of the edges of the belt, the third groove terminating in an end cavity and adapted to receive the locating pin,
an endless retainer band adapted for mounting around the belt, the band having interior and exterior surfaces, and opposed band edges,
a locating pin protruding from the interior surface of the band, the locating pin received in the first groove as the retainer band is slid over the belt and received in the end cavity of the second or third grooves to restrain the band from farther circumferential rotation with respect to the belt regardless of the direction of rotation of the shafts.
2. The shaft coupling of claim 1 wherein the first groove extends substantially perpendicular from one edge of the belt to the opposite edge of the belt.
3. The shaft coupling of claim 1 wherein the number of teeth on the first face are equal to the number of teeth on the second face.
4. The shaft coupling of claim 2 wherein the flexible belt has a width such that the teeth on the first face do not contact the teeth on the second face.
5. The shaft coupling of claim 1 wherein the teeth and projections are wedge shaped and the teeth and projections have sides whereby the sides of a pair of teeth form a planar surface which is adjacent and parallel to the sides of the projection.
6. The shaft coupling of claim 1 wherein the end cavity protrudes in an axial direction toward a center line midway between the opposite edges of the belt.
7. The shaft coupling of claim 1 wherein the locating pin is positioned closer to one band edge than the other.
8. A shaft coupling comprising:
first and second hubs, each having respective first and second faces;

first and second pluralities of teeth extending from the respective first and second faces, the teeth on the first face in parallel alignments with the teeth on the second face, the aligned teeth forming gaps between adjacent pairs of aligned teeth;

a split, flexible belt having opposed edges and an inside and an outside surface, a plurality of spaced projections on the inside surface, each of the projections occupying one of the gaps, a first groove on the outside surface of the belt, extending substantially perpendicular from one edge of the belt to the other, a second groove on the outside surface of the belt in communication with the first groove and extending substantially perpendicular from the first groove and positioned closer to one edge than the other, the groove terminating at an end cavity, a third groove on the outside surface of the belt in communication with the first groove and extending substantially perpendicular from the first groove and positioned closer to the other edge of the belt, the groove terminating at an end cavity, an endless retainer band adapted for mounting around the belt, the band having interior and exterior surfaces and opposed band edges, a locating pin protruding from the interior surface of the band at a point closer to one edge than the other, the locating pin received in the first groove as the retainer band is slid over the belt, and received in either the second or third grooves depending upon the position of the pin with respect to the belt so that the edges of the belt ultimately are aligned with the band edges, with the locating pin finally positioned in the end cavity to restrain the band from further circumferential rotation with respect to the belt regardless of the direction of rotation of the shafts.

9. The coupling of claim 8 wherein the second and third grooves extend in opposite circumferential directions from the first groove.

* * * * *